United States Patent
Suetsuna et al.

(10) Patent No.: US 7,700,194 B2
(45) Date of Patent: Apr. 20, 2010

(54) HIGH-FREQUENCY MAGNETIC MATERIAL COMPRISING AN OXIDE PHASE AND METHOD FOR PRODUCING THE SAME

(75) Inventors: Tomohiro Suetsuna, Kawasaki (JP); Seiichi Suenaga, Yokohama (JP); Kouichi Harada, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/046,016

(22) Filed: Mar. 11, 2008

(65) Prior Publication Data

US 2008/0226899 A1     Sep. 18, 2008

(30) Foreign Application Priority Data

Mar. 12, 2007   (JP) .............................. 2007-061835

(51) Int. Cl.
   *B32B 5/16*   (2006.01)
(52) U.S. Cl. .................... 428/403; 428/570; 428/693.1; 428/701
(58) Field of Classification Search ................. 428/403, 428/570, 693.1, 701
   See application file for complete search history.

(56) References Cited

U.S. PATENT DOCUMENTS 5,290,629 A * 3/1994 Kobayashi et al. .......... 428/812

| | | |
|---|---|---|
| 2006/0068196 A1 | 3/2006 | Suenaga et al. |
| 2008/0226899 A1 | 9/2008 | Suetsuna et al. |
| 2008/0267806 A1 | 10/2008 | Suetsuna et al. |

FOREIGN PATENT DOCUMENTS

| | | |
|---|---|---|
| JP | 2004-18361 | 1/2004 |
| JP | 2004-281846 | 10/2004 |

OTHER PUBLICATIONS

U.S. Appl. No. 12/406,575, filed Mar. 18, 2009, Harada, et al.

\* cited by examiner

*Primary Examiner*—H. (Holly) T Le
(74) *Attorney, Agent, or Firm*—Oblon, Spivak, McClelland, Maier & Neustadt, L.L.P.

(57) ABSTRACT

A high-frequency magnetic material is provided and includes: an oxide phase including: a first oxide of a first element being at least one selected from the group consisting of Mg, Al, Si, Ca, Zr, Ti, Hf, Zn, Mn, a rare-earth element, Ba, and Sr, and a second oxide of a second element being at least one selected from the group consisting of Li, Na, K, Rb, Cs, Be, Mg, Ca, Sr, Ba, and Zn, the first oxide and at least a part of the second oxide being formed into a solid solution; and magnetic metal particles including at least one of Fe and Co and having a particle size of 1 to 100 nm, the magnetic metal particles being deposited on a surface and inside of the oxide phase, the magnetic metal particles occupying 50% of a volume of the high-frequency magnetic material exclusive of a void.

14 Claims, No Drawings

HIGH-FREQUENCY MAGNETIC MATERIAL COMPRISING AN OXIDE PHASE AND METHOD FOR PRODUCING THE SAME

The present application is based upon and claims the benefit of priority from Japanese Patent Application No. JP2007-61835 filed on Mar. 12, 2007, the entire disclosure of which is incorporated herein by reference.

BACKGROUND OF THE INVENTION i) Field of the Invention

The present invention relates to a high-frequency magnetic material exhibiting a high magnetic permeability at high frequencies, and to a method for producing the material. More particularly, the present invention relates to a high-frequency magnetic material which is useful at high frequencies ranging from 10 MHz to several tens of gigahertz, and to a method for producing the material.

ii) Related Art

A magnetic material is recently applied to an inductor, electromagnetic wave absorber, magnetic ink, and the like, and the importance of the magnetic material is increasing. In connection with a magnetic material used in these applications, a real part ($\mu'$) of a magnetic permeability or an imaginary part ($\mu''$) of the magnetic permeability is utilized. For instance, a high $\mu'$ (or low $\mu''$) is utilized for an inductor, and a high $\mu''$ is utilized for an electromagnetic wave absorber. Therefore, when a magnetic material is actually used as a component, $\mu'$ and $\mu''$ must be controlled in accordance with an operating frequency band of an electronic device. In recent years, since the operating frequency band of the electronic device has become higher, a strong demand exists for a technique for producing a material whose $\mu'$ and $\mu''$ can be controlled at high frequencies.

Ferrite and an amorphous alloy are principally used as a magnetic material for an inductor employed at high frequencies of 1 MHz or more. These magnetic materials do not induce a loss (low $\mu''$) at frequencies of 1 MHz to 10 MHz and exhibit a high $\mu'$ and a superior magnetic characteristic. However, the real part $\mu'$ of magnetic permeability of these magnetic materials decreases at higher frequencies of 10 MHz or more, and sufficient characteristics are not necessarily acquired.

For these reasons, development of an inductor utilizing a thin-film technique, such as sputtering or plating has been performed actively. However, the thin-film technique, such as sputtering, requires a large-size facility and precise control of a film thickness, or the like. Therefore, the thin-film technique is not well sufficient in terms of cost and yield. Further, an inductor manufactured by the thin-film technique lacks long hours of thermal stability of a magnetic characteristic at high temperatures and high humidity.

On the other hand, the electromagnetic wave absorber absorbs noise by means of utilization of high $\mu''$, thereby preventing occurrence of failures in electronic equipment. The electronic equipment includes a semiconductor element, such as an IC chip, or various types of communications equipment. Such electronic equipment includes various devices; for example, a device used at a frequency range of one megahertz to several gigahertz or a device used at high frequencies of several tens of gigahertz or more. Recently, the number of pieces of electronic equipment used at high frequency ranges of 1 GHz or more particularly tends to increase. An electromagnetic wave absorber of electronic equipment used at high frequencies has hitherto been manufactured by means of a binder molding technique for mixing ferrite particles, carbonyl iron particles, FeAlSi flakes, FeCrAl flakes, or the like, with a resin. However, these materials exhibit extremely-low $\mu'$ and $\mu''$ at high frequencies of 1 GHz or more, and a sufficient characteristic has not been acquired.

A material synthesized by means of a mechanical alloying technique, or the like, lacks long hours of thermal stability, and provides low yield.

A high-frequency magnetic material containing irreducible metal oxide and magnetic metal particles deposited on the surface and inside of the oxide has been known (JP-A-2004-281846). Moreover, there has been known a technique for producing a composite oxide sintered body by means of causing irreducible metal oxide, a magnetic metal oxide, and an oxide-based sintering aids to react with one another and reducing the composite oxide sintered body, thereby producing composite oxide with metal particles (Japanese Patent No. 3776839).

SUMMARY OF THE INVENTION

An object of an illustrative, non-limiting embodiment of the invention is to provide a high-frequency magnetic material which exhibits a superior magnetic characteristic at high frequencies and which provides long hours of superior thermal stability of a magnetic characteristic. Moreover, another object is to provide a method for producing a high-frequency magnetic material at high yield.

According to a first aspect of the invention, there is provided a high-frequency magnetic material including:
  an oxide phase including:
    a first oxide of a first element being at least one selected from the group consisting of Mg, Al, Si, Ca, Zr, Ti, Hf, Zn, Mn, a rare-earth element, Ba, and Sr, and
    a second oxide of a second element being at least one selected from the group consisting of Li, Na, K, Rb, Cs, Be, Mg, Ca, Sr, Ba, and Zn, the second element being different from the first element,
    the first oxide and at least a part of the second oxide being formed into a solid solution; and
  magnetic metal particles including at least one of Fe and Co and having a particle size of 1 to 100 nm, the magnetic metal particles being deposited on a surface and inside of the oxide phase,
  the magnetic metal particles occupying 50% of a volume of the high-frequency magnetic material exclusive of a void.

According to a second aspect of the invention, there is provided a high-frequency magnetic material including:
  an oxide phase including:
    a first oxide of a first element selected from the group consisting of Mg, Zn, Ca, and Mn, and
    a second oxide of a second element being at least one selected from the group consisting of Li, Na, K, Rb, and Cs,
    the first oxide and the second oxide being formed into a solid solution in an amount of the second oxide of 0.1 to 10 mol % with respect to the first oxide; and
  magnetic metal particles including at least one of Fe and Co and having a particle size of 1 to 100 nm, the magnetic metal particles being deposited on a surface and inside of the oxide phase.

According to a third aspect of the invention, there is provided a method for producing a high-frequency magnetic material, the method including reducing a precursor including:
  a first salt of a magnetic metal element, the first salt being at least one selected from the group of an alkoxide, a hydroxide salt, a sulfate, a nitrate, a carbonate, a carboxylate;

a second salt of at lease one first element selected from the group consisting of Mg, Al, Si, Ca, Zr, Ti, Hf, Zn, Mn, a rare-earth element, Ba, and Sr, the second salt being at least one selected from the group of an alkoxide, a hydroxide salt, a sulfate, a nitrate, a carbonate, a carboxylate; and a third salt of at least one second element selected from the group consisting of Li, Na, K, Rb, Cs, Be, Mg, Ca, Sr, Ba, and Zn, the second element being different from the first element.

According to a fourth aspect of the invention, there is provided a high-frequency magnetic material produced by reducing a precursor, the precursor including:

a first salt of a magnetic metal element, the first salt being at least one selected from the group of an alkoxide, a hydroxide salt, a sulfate, a nitrate, a carbonate, a carboxylate;

a second salt of at lease one first element selected from the group consisting of Mg, Al, Si, Ca, Zr, Ti, Hf, Zn, Mn, a rare-earth element, Ba, and Sr, the second salt being at least one selected from the group of an alkoxide, a hydroxide salt, a sulfate, a nitrate, a carbonate, a carboxylate; and a third salt of at least one second element selected from the group consisting of Li, Na, K, Rb, Cs, Be, Mg, Ca, Sr, Ba, and Zn, the second element being different from the first element.

DETAILED DESCRIPTION OF THE EXEMPLARY EMBODIMENTS

According to an aspect of the present invention, there can be provided a high-frequency magnetic material which exhibits a superior magnetic characteristic at high frequencies and which provides long hours of superior thermal stability of a magnetic characteristic. Moreover, according to another aspect of the present invention, there can be provided an inexpensive method for producing a high-frequency magnetic material at high yield.

High-frequency magnetic materials of exemplary embodiments of the present invention and a method for producing the same will be described in detail as below.

First Embodiment

A high-frequency magnetic material of a first embodiment of the present invention will be described.

The high-frequency magnetic material of the embodiment includes: an oxide of a solid solution of an irreducible oxide phase and an additive oxide phase; and magnetic metal particles which exist on the surface and inside of the oxide phases.

The magnetic metal particles include metal particles formed from a least one type of substance selected from Fe, Co, and alloys containing Fe and Co as a base. Here, an alloy containing Fe as a base means an alloy containing 50 at % (atomic percent) or more of Fe, and an alloy containing Co as a base means an alloy containing 50 at % or more of Co.

In the present embodiment, the magnetic metal particles may be at least one type of particle selected from Fe particles, Co particles, FeCo alloy particles, FeCoNi alloy particles, Fe-based alloy particles, and Co-based alloy particles. Examples of the Fe-based alloy and the Co-based alloy include: an FeNi alloy, an FeMn alloy, an FeCu alloy, a CoNi alloy, a CoMn alloy, and a CoCu alloy which contain Ni, Mn, Cu, or the like, as a second component; and a FeCo alloy to contain Ni, Mn, or Cu. Moreover, from the viewpoint of oxidation resistance, Fe-based alloy particles may be partially replaced with another element, and examples thereof include FeCo, FeCoNi, and FeNi. In particular, the FeCo-based alloy particles may be employed in terms of saturated magnetization. Further, a portion of the Fe-based alloy or the Co-based alloy may also be replaced with a third element (another component).

The Fe-based alloy or the Co-based alloy may also be alloyed with a nonmagnetic metallic element. When the amount of nonmagnetic metallic element is excessively large, saturated magnetization is decreased. Therefore, in consideration of the permeability which is related to the saturated magnetization, the percentage of the nonmagnetic metallic element (reducible metal other than Fe and Co) alloyed may be 10 at % or less. The nonmagnetic metal may also be dispersed alone in a system, and an amount of the nonmagnetic metal may be a volume ratio of 20% or less with respect to the amount of the magnetic metal particles. In relation to the above alloys, the total amount of Fe and Co may accounts for 50 at % or more of the entire alloy.

The volume ratio (filling factor) of the magnetic metal particles exclusive of voids, such as pores, in a high-frequency magnetic material may be 50% or more. In the high-frequency magnetic material having such a filling factor, saturated magnetization per volume or weight can be increased, and the magnetic permeability can be enhanced.

The magnetic metal particles may have an average particle size of 1 to 100 nm. When the average particle size is less than 1 nm, superparamagnetism arises or the amount of magnetic flux becomes insufficient. On the other hand, when the average particle size exceeds 100 nm, an eddy-current loss arising at high frequencies may become greater, and a magnetic characteristic at a target high frequency may be decreased. An increase in particle size results in occurrence of an eddy-current loss, and magnetic metal particles become stable in terms of energy by having a single domain structure rather than a multi-domain structure. However, the high-frequency characteristic of magnetic permeability of the multi-domain structure may become worse than that of the single domain structure. Therefore, when the magnetic metal particles are used as a high-frequency magnetic member, it is better that the magnetic metal particles exist as single domain particles. Since a critical particle size at which the single domain structure is maintained is about 100 nm or less, the particle size of the magnetic metal particles can be set to 100 nm or less. For these reasons, the average particle size of the metal particles can be within the range from 1 nm to 100 nm.

The irreducible oxide phase includes metal oxides which are less likely to be reduced to metal under a hydrogen atmosphere at from a room temperature to 1500° C. Such metal oxides include oxides of Mg, Al, Si, Ca, Zr, Ti, Hf, Zn, Mn, a rare-earth element, Ba, Sr, and the like. One or a plurality of types of oxides selected from the above may also be used as the irreducible metal oxide. The irreducible oxide phase can be a composite oxide including an oxide of at least either Fe or Co and an irreducible metal oxide. In consideration of the ease of controlling the composition, the composite oxide may be present in the form of a solid solution; especially a complete solubility system in the solid state, e.g., a (Fe,Mg)O system, a (FeCo,Mg)O system, a (FeCoNi,Mg)O system, a (Co,Mg)O system, and the like. Moreover, when two types of irreducible metal oxides or more are used, composite oxides of two types or more may also be formed.

The irreducible oxide phase and the magnetic metal particles should preferably be aligned to each other in at least two axes or more of respective crystal orientations. By means of adoption of such a form, lattice matching between the magnetic metal particles and the oxide becomes very superior, and a high-frequency magnetic material which is thermally very stable can be acquired. A combination of the magnetic metal particles and the irreducible oxide phase—which are aligned to each other in terms of two axes or more of a crystal orientation—includes; for example, a (Fe,Mg)O system, a (FeCo,Mg)O system, a (FeCoNi,Mg)O system, a (Co,Mg)O system, a (Fe,Mn)O system, a (FeCo,Mn)O system, a (FeCoNi,Mn)O system, a (Co,Mn)O system, and the like.

An average particle size of an oxide may be from 10 nm to 1 μm; in particular, 100 nm to 500 nm. As a result of the average particle size of an oxide falls within the range, the oxide can become extremely resistant to a heat cycle and can exhibit a superior thermally-magnetic characteristic for long hours.

The additive oxide phase is a metal oxide of at least one type selected from the group consisting of Li, Na, K, Rb, Cs, Be, Mg, Ca, Sr, Ba, and Zn. Although the entirety of the additive oxide phase may also be present in the form of a solid solution in the irreducible metal oxide, but may also exist in a grain boundary of the irreducible metal oxide particles.

When a monovalent or bivalent additive oxide is added to a p-type bivalent irreducible oxide, to thus create solid solution, reduction proceeds not only over the surface of composite oxide particles but also inside of the particles. When monovalent $Li_2O$ exhibiting a large solid solution limit to various oxides is formed into a solid solution, a high-frequency magnetic material heavily filled with magnetic metal particles having a uniform particle size from several nanometers to one hundred nanometers is acquired.

The composition of the additive oxide can be 0.1 to 50 mol %, and in particular, 0.1 to 10 mol %, to the irreducible oxide, from the viewpoint of enhancement of a magnetic characteristic.

According to the first embodiment described above, there can be provided a high-frequency magnetic material which exhibits a superior magnetic characteristic at high frequencies and which exhibits a superior thermally-stable magnetic characteristic for long hours.

The high-frequency magnetic material of the present embodiment does not involve a loss other than a ferromagnetic resonance loss and exhibits high magnetic permeability even at high frequencies, and the ferromagnetic resonance frequency of the high-frequency magnetic material ranges over several gigahertz. Therefore, the high-frequency magnetic material has a high real part ($\mu'$) of the magnetic permeability and a low imaginary part ($\mu''$) of the magnetic permeability at frequency ranges which are lower than the ferromagnetic resonance frequency. Hence, the high-frequency magnetic material can be utilized as a high magnetic permeability component, such as an inductor, a filter, a transformer, a choke coil, and an antenna board for use in a portable cellular phone or a wireless LAN.

Further, the high-frequency magnetic material of the present embodiment exhibits a low $\mu'$ and a high $\mu''$ in the vicinity of the ferromagnetic resonance frequency. Hence, the high-frequency magnetic material can be utilized as an electromagnetic wave absorber. Specifically, even one high-frequency magnetic material exhibits high versatility which enables use of the material as a high magnetic permeability component or an electromagnetic wave absorber by selection of a frequency range of the high-frequency magnetic material.

Second Embodiment

A high-frequency magnetic material of a second embodiment of the present invention and a method for producing the same will be described in detail hereinbelow.

The method of the present embodiment may include a process (a first process) of mixing salt containing a magnetic metal element, salt containing a metal element from which an irreducible oxide phase originates, and salt containing a metal element from which an additive oxide phase originates, to thus synthesize a precursor; and a process (a second process) of depositing magnetic metal particles by reducing precursor powder. According to the method, there can be manufactured a high-frequency magnetic material containing an oxide including the irreducible oxide phase and the additive oxide phase and the magnetic metal particles deposited on the surface and inside of the oxide.

(First Process)

In the first process, there are prepared salt (A) used for forming magnetic metal containing at least one type of element of Fe or Co; salt (B) used for forming an irreducible metal oxide; and salt (C) used for forming an additive oxide. The salts (A) and (B) are mixed together in such a way that a mol ratio of the salt (A) to the salt (B) falls within a range of A:B=1:9 to 9:1, and the salts (B) and (C) are mixed together in such a way that a mol ratio of the salt (B) to the salt (C) falls within the range from 0.1% to 50%. Examples of salts include alkoxide or hydroxide, sulfate, nitrate, carbonate, and carboxylate. Alkoxide includes; for example, methoxide, ethoxide, butoxide, propoxide, and the like.

The salt (A) used for forming a magnetic metal oxide (hereinafter called a "magnetic metal oxide formation salt") may contain at least one type of magnetic metal or magnetic alloy selected from the group consisting of Fe, Co, FeCo, FeCoNi, an Fe-based alloy, and a Co-based alloy. The Fe-based alloy includes a FeNi alloy, a FeMn alloy, and a FeCu alloy which contain as a second component Ni, Mn, or Cu. The Co-based alloy includes a CoNi alloy, a CoMn alloy, and a CoCu alloy. Moreover, the Co-based alloy includes alloys formed by causing the FeCo alloy to contain Ni, Mn, or Cu. When these alloys are decomposed and reduced to metal particles, they can enhance a high-frequency magnetic characteristic of the high-frequency magnetic material. Fe oxides or Co oxides can facilitate formation of the solid solution with irreducible metal oxide, which will be described later. Moreover, a system whose portion is replaced with another element may be used for the Fe-based alloy; specifically, FeCo, FeCoNi, and FeNi can be used from the viewpoint of oxidation resistance. Moreover, a FeCo-based alloy may be used from the viewpoint of enhancing saturated magnetization of the high-frequency magnetic material.

Portions of these alloys may also be replaced with a third element (another component). The magnetic metal and the magnetic alloy may also be alloyed with a nonmagnetic metal element. However, when the amount of nonmagnetic metal element is excessively large, saturated magnetization is decreased. Therefore, in consideration of permeability, the amount of another nonmagnetic metal element (reducing metal other than Fe or Co) used for alloying may be 10 at % or less. In relation to the alloys mentioned above, the total amount of Fe and Cu can be 50 at % or more of the entire alloy. The reducing nonmagnetic metal element includes Mo, Cu, and the like.

A metal oxide which is less likely to be reduced to metal under a hydrogen atmosphere at form a room temperature to 1500° C. is used for the salt (B) used for forming an irreducible oxide phase (hereinafter called an "irreducible oxide phase formation salt"). Such an irreducible oxide element includes Mg, Al, Si, Ca, Zr, Ti, Hf, Zn, Mn, a rare-earth element, Ba, Sr, and the like. Only one or a plurality of types of elements selected from above may also be used.

The irreducible metal oxide element can form a composite with at least one of Fe and Co. In consideration of the ease to control a composition, there may be a system forming a solid solution in the state of an oxide, especially, a complete solubility system in the solid state, e.g., a Fe/Mg system, a FeCo/Mg system, a FeCoNi/Mg system, a Co/Mg system, or the like.

The magnetic metal and the oxide can be aligned to each other in at least two axes or more of respective crystal orientations. By means of adoption of such a form, lattice matching between the magnetic metal particles and the oxide may become very superior, and a high-frequency magnetic material which is very thermally stable can be acquired. A system whose crystal orientations are aligned in two axes or more includes a Fe/Mg system, a FeCo/Mg system, a FeCoNi/Mg system, a Co/Mn system, and the like.

A metal element serving as the source of the salt (C) used for forming an additive oxide (hereinafter called an "additive oxide formation salt") may be one type of element selected from Li, Na, K, Rb, Cs, Be, Mg, Ca, Sr, Ba, and Zn (however, the element differs from the irreducible metal oxide element); and especially, Li and Ba can be used.

Carbonate or hydroxide originating from at least one type of metal selected from the above may be used as the additive oxide formation salt (C); and especially $Li_2CO_3$ and $BaCO_3$ can be used.

The additive oxide phase may be formed into a solid solution of a composite oxide including the magnetic metal oxide and the irreducible metal oxide. As a result of formation of the additive oxide phase into a solid solution, a defect concentration; especially, an oxygen vacancy concentration, of the composite oxide becomes greater. When the composite oxide is reduced, the speed of the deposition of the magnetic metal particles can be increased and the magnetic metal particles can be deposited not only on the surface of the composite oxide but also inside the composite oxide. As a result, a magnetic material—in which magnetic metal nanoparticles are uniformly dispersed and deposited in the oxide phase at a high filling rate—can be produced.

When a composite oxide including a bivalent p-type irreducible oxide and a magnetic metal oxide is reduced, magnetic metal particles are deposited from the magnetic metal oxide. However, the magnetic metal particles are selectively deposited over the surface of the oxide particles, and hence a filling factor (a deposition rate) of the magnetic metal particles is not increased. Further, when an attempt is made to increase the amount of deposited oxide particles by tougher reduction conditions (an attempt is made to increase the filling rate), the magnetic metal particles become agglomerated or necked on the surface of the oxide particles, so that the state of uniform nanoparticles cannot be maintained. Moreover, when an oxide of trivalent or quadrivalent element is solved into the bivalent p-type composite oxide, a cation vacancy concentration is increased, and a reduction deposition reaction rate at which magnetic metal particles are deposited from the magnetic metal oxide at the time of reduction is increased. At that time, the magnetic metal particles are deposited mainly on the surface of composite oxide. Hence, agglomeration and necking of the magnetic metal particles become noticeable, and maintaining the state of uniform nanoparticles becomes difficult to a much greater extent.

On the other hand, when, in particular, a monovalent or bivalent additive oxide is caused to be present in the form of a solid solution in the bivalent p-type composite oxide, uniform magnetic metal particles can be filled highly. In particular, when monovalent $Li_2O$ exhibiting a great solid solution limit to various oxides is formed into a solid solution, an oxygen vacancy concentration in the composite oxide becomes greater, and reduction of inside of the particles and reduction of the surface of the composite oxide particles proceed, and magnetic metal particles—which are more uniform than related-art magnetic metal particles whose particle size range from several nanometers to 100 nanometers or less—can be highly filled.

The composition of the additive oxide may be 0.1 to 50 mol %; in particular, 0.1 to 10 mol %, with respect to the irreducible metal oxide. Within this range, as the amount of additive oxide in the solid solution is increased, a diffusion rate becomes faster. Thus, a sufficient amount of magnetic metal particles can be deposited with a small amount of energy. As a result, low-cost processes can be achieved. Because excessive thermal stress is not imposed when the magnetic metal particles are deposited on the surface of the oxide phase and inside of the oxide phase, magnetic metal particles can be deposited inside of the oxide phase and over the surface of the oxide phase in a thermally-stable, strongly-adhering state.

However, on the other hand, as the amount of the additive oxide becomes great, the filling factor of the magnetic metal particles does not increase, which is not preferable. An optimum composition of oxide—which enables an effective increase of the defect density of the composite oxide while a high filling factor of magnetic metal particles is maintained—may range from 0.1 to 10 mol %. As a result, the particle deposition rate can be increased, and internal deposition of particles becomes practicable.

The additive oxide phase (C) may be present in the composite oxide phase in the form of a solid solution. However, the additive oxide phase may also be present in the grain boundary of particles rather than being present in the composite oxide phase in the form of a solid solution.

A method for synthesizing the precursor will now be described.

The precursor can be produced by means of; for example, mixing powder of the salts and drying the thus-mixed powder at 100° C. to 200° C. (i.e., evaporation of water from hydrate). Alternatively, the precursor can be produced by means of a method including: dissolving a mixture of salt powder used for the purpose of forming magnetic metal and salt powder used for the purpose of forming oxide phase into a target aqueous solution; crystallizing a dissolved substance; and drying the crystallized substance at 100° C. to 200° C.

Here, for example, when sulfate of magnetic metal and a metal element used for the purpose of forming an oxide is formed, an aqueous solution of sulfuric acid is used as the target aqueous solution. Moreover, when nitrate of magnetic metal and a metal element used for the purpose of forming an insulating oxide is formed, an aqueous solution of nitric acid is used as the target aqueous solution.

When hydroxide of magnetic metal and a metal element used for the purpose of forming an oxide is formed, an aqueous solution is synthesized by means of a coprecipitation process, an inverse coprecipitation process (a process for dripping nitrate, or the like, into an aqueous alkaline solution, such as ammonium, and precipitating the salt), or the like. Thus, the salt is crystallized and dried, whereby uniform precursor particles can be obtained.

Since the precursor particles have the particle size ranging from 10 nm to 1 μm, dispersion of constituent components of the precursor readily proceed in a subsequent heat treatment process (a process for sintering the precursor while decomposing and reducing the precursor), thereby enabling producing of a densified high-frequency magnetic material.

(Second Process)

Magnetic metal particles are deposited in the second process while the precursor acquired in the first process is reduced.

The precursor synthesized in the first process is heated under a reducing atmosphere, to thus decompose salt containing a metal element from which an oxide phase originates and to generate oxide particles. Further, magnetic metal particles are deposited on the surface of the oxide particles and inside of the oxide particles, thereby producing a high-frequency magnetic material.

Specifically, the precursor is heated under the reducing atmosphere, whereby salt of a magnetic metal element—which is formed from at least one of Fe and Co in the precursor particles or from any one of alloys including Fe and Co as a base—is decomposed and reduced, to thus deposit magnetic metal particles. Concurrently with deposition of the magnetic metal particles, the irreducible oxide formation salt (B) and the additive oxide formation salt (C) in the precursor particles are decomposed to oxides, and the oxides enclose the magnetic metal particles during the decomposition, whereby densification of the high-frequency magnetic material proceeds. In short, adhesion of the deposited magnetic metal particles to the composite oxide is enhanced.

As a result, a granular high-frequency magnetic material exhibiting a thermally-magnetic characteristic for long hours can be acquired. Further, a compact high-frequency magnetic material can be acquired by means of diminishing an unwanted volume, such as the volume of pores, through densification. Moreover, a magnetic characteristic can be enhanced by means of reducing pores or voids which affect a loss in magnetic characteristic. In the case of a precursor, extremely superior reactivity can be achieved, and a reaction time can be shortened. Accordingly, agglomeration or sintering of the reduced magnetic metal particles can be inhibited, and a granular high-frequency magnetic material—in which fine magnetic metal particles are uniformly dispersed—can be obtained.

A reducing atmosphere employed at the time of heating of the precursor includes; for example, a nitrogen or argon atmosphere including a reducing gas, such as hydrogen or carbon monoxide, a nitrogen or argon atmosphere in a state where an object of heating is coated with a carbon material, and the like. Further, the nitrogen or argon atmosphere including a reducing gas may be formed by means of an air flow. A flow rate of the air flow may be 10 mL/min. or more.

Heating performed under the reducing atmosphere can be conducted at a temperature of 100° C. to 800° C. When the heating temperature is set to a value which is less than 100° C., there may arise a risk of a decrease occurring in the progress of the reducing reaction. In contrast, when the heating temperature exceeds 800° C., there may arise a risk of agglomeration or grain growth of the deposited metal fine particles proceeding within a short period of time. No specific limits are imposed on a reducing temperature and a reducing time, so long as at least salt, such as nitrate of magnetic metal, can be reduced. Further, the reducing time is determined from reducing temperature, and a reducing time can be set so as to fall within the range of; for example 10 minutes to 10 hours.

The magnetic metal particles deposited by means of heating performed under the reducing atmosphere may have a particle size ranging from 1 nm to 100 nm; especially, from 10 nm to 50 nm. When the particle size of the magnetic metal particles is set to a value of less than 10 nm, there may arise a risk of superparamagnetism or a deficiency in the amount of magnetic flux occurring. In contrast, when the particle size of the magnetic metal particles exceeds 100 nm, there may arise a risk of an eddy-current loss developing at high frequency ranges becoming greater and a risk of a reduction occurring in a magnetic characteristic achieved at high frequency ranges to which the high-frequency magnetic material is to be applied.

An increase in particle size results in occurrence of an eddy-current loss, and magnetic metal particles become stable in terms of energy by having a single domain structure rather than a multi-domain structure. However, the high-frequency characteristic of magnetic permeability of the multi-domain structure becomes worse than that of the single domain structure. Therefore, when the magnetic metal particles are used as a high-frequency magnetic member, the magnetic metal particles may be present in the form of single domain particles. Since a critical particle size at which the single domain structure is maintained is about 100 nm or less, the particle size of the magnetic metal particles can be set to 100 nm or less.

The magnetic metal particles may be aligned to crystal orientations of an insulating oxide—into and with which the magnetic metal particles are dispersed and brought into contact—in at least two axes or more. A combination of the magnetic metal particles and the insulating oxide—which are aligned to each other in terms of a crystal orientation in two axes or more—includes; for example, Co/MgO, FeNi/MgO, CoFe/MgO, CoNi/MgO, Co/MnO, FeNi/MnO, CoFe/MnO, CoNi/MnO, and the like.

As a result of the precursor being heated under the reducing atmosphere while undergoing a magnetic field, crystallographic axes of deposited magnetic metal particles can be aligned to each other. As a result of the crystallographic axes of the magnetic metal particles being oriented, magnetocrystalline anisotropy can be controlled, and enhancement of a high-frequency characteristic becomes practicable.

The volume ratio (filling factor) of the deposited magnetic metal particle exclusive of voids, such as pores, in a high-frequency magnetic material may be 50% or more. In the high-frequency magnetic material having such a volume ratio, saturated magnetization per volume or weight can be increased, and magnetic permeability can be enhanced. No limits are imposed on the form of the high-frequency magnetic material. The high-frequency magnetic material can have any form; that is, the form of powder, the form of a bulk (the shape of a pellet, a ring shape, a rectangular shape, and the like), a film-like shape including the form of a sheet, and the like.

When a bulk is manufactured, powder of high-frequency magnetic material may also be sintered. Alternatively, the foregoing mixed salt may be sintered through heating at the temperature from 100° C. to 800° C. after molded into an arbitrary shape. In particular, heating can be performed by use of hot pressing (a uniaxial pressing process), HIP (a hot isostatic pressing process), SPS (a spark plasma sintering process), and the like.

When a film including a sheet is manufactured, slurry including granular insulating oxides in which magnetic metal oxides have been deposited is prepared, and the slurry is subsequently molded in the shape of a sheet, thereby forming a sheet-shaped molded article. Subsequently, the molded sheet is heated and sintered, thereby manufacturing a sheet-like high-frequency magnetic material. Heating can be performed at a temperature of: e.g., 100° C. to 800° C. Alternatively, when the molded sheet is used as is, magnetic material powder is dispersed in a synthetic resin, such as an epoxy resin, to thus be formed into a sheet or a bulk.

When a high-frequency magnetic material is fabricated to a high-frequency magnetic component, machining, such as cutting or grinding, is performed for the case of a sintered body; and the high-frequency magnetic material is compounded with a resin for the case of powder. Further, the high-frequency magnetic material is subjected to surface treatment, as needed. Moreover, when the high-frequency magnetic material is used as an inductor, a choke coil, a filter, and a transformer, winding is performed.

Third Embodiment

A method for producing a high-frequency magnetic material of a third embodiment and a high-frequency magnetic material produced by the method will now be described.

The high-frequency magnetic material of the present embodiment contains magnetic metal particles formed from at least one type of material selected from the group consisting of Fe, Co, and alloys taking them as bases; an oxide phase; and an additive oxide phase. The present embodiment is characterized by a combination of the salt (A) containing the previously-described magnetic metal element; the salt (B) containing a metallic element from which an irreducible oxide phase originates; and the additive oxide formation salt (C).

The combination can form a system in which a difference among magnetic metal, an oxide phase, and an additive oxide in terms of standard generation Gibbs energy is 100 kJ/mol or less; especially, 50 kJ/mol or less within the temperature range from 100° C. to 800° C. Such a combination includes; for example, $Fe(OH)_2/Mg(OH)_2$, $Co(OH)_2/Mg(OH)_2$, $Fe(OH)_2/Si(OH)_4$, $Co(OH)_2/Si(OH)_4$, $Fe(OH)_2/MgCO_3$, $Fe(OH)_2/MgSO_4$, and the like.

By means of such a combination, in the process for effecting heating operation under the reducing atmosphere, a reaction—by means of which magnetic metal particles are deposited by salt formed from magnetic metal element—becomes analogous, in terms of a value of energy, to a reaction by means of which salt containing a metallic element from which an oxide phase originates turns into an insulating oxide—, and the reactions proceed essentially simultaneously. Consequently, since the reactions proceed while the magnetic metal particles are deposited and while the thus-deposited magnetic metal particles are taken inside the insulating oxide, a highly-packed high-frequency magnetic material—in which magnetic metal particles are disposed and embedded—can be manufactured.

A salt component still remains in the high-frequency magnetic material obtained by means of such a combination after the reduction. For example, when $MgSO_4$ is utilized, S (sulfur) still exists. Therefore, the process can be distinguished from an ordinary process for reducing an oxide.

In the first to third embodiments, a high-frequency magnetic material can be a polycrystalline. The expression "high-frequency magnetic material is a polycrystalline" means that the high-frequency magnetic material can be manufactured by means of a powder metallurgy process (a sintering process), which enables cost cutting.

In the first to third embodiments, the deposited metal particles may also be a single crystal. When the single crystal composite oxide is used, the deposited magnetic metal particles are aligned to the composite oxide. Therefore an easy axis of the magnetic metal particles can be aligned and magnetocrystalline anisotropy can be controlled, and the high-frequency characteristic is enhanced when compared with the case of a polycrystal. No limits are imposed on the form of the high-frequency magnetic material; specifically, the high-frequency magnetic material of the first through third embodiments assumes the form of powder, the form of a bulk (the shape of a pellet, a ring shape, a rectangular shape, and the like), a film-like shape including the form of a sheet, and the like.

Fourth Embodiment

A fourth embodiment of the present invention relates to a method for producing a sheet-like high-frequency magnetic material by use of the high-frequency magnetic materials of the first to third embodiments.

A high-frequency magnetic material constituting a multi-layer structure can be manufactured by means of forming a sheet-like insulating oxide having a thickness of 1 μm or less by use of an insulating oxide containing magnetic metal particles of the first to third embodiments; stacking on top of the other the sheet-like insulating oxide and a non-magnetic insulating oxide having a thickness of 1 μm or less one; and subjecting the thus-stacked structure to heating and sintering. Specifically, the degree of influence of a demagnetizing field—which arises when a high-frequency magnetic field is applied in an in-plane direction—can be diminished by means of reducing the thickness of the layer (the layer of a magnetic material) of insulating oxide containing magnetic metal particles to 1 μm or less, which in turns enables an increase in magnetic permeability.

Moreover, magnetic coupling is disconnected by means of stacking the above-mentioned nonmagnetic insulating oxide layers so as to be sandwiched between magnetic material layers rather than simply stacking the magnetic material layers, thereby lessening the influence of a demagnetizing field imposed on the entire bulk. Specifically, a nonmagnetic insulating oxide layer is sandwiched between magnetic material layers, thereby disconnecting magnetic coupling between the magnetic material layers and reducing the magnitude of a magnetic pole. Thus, the influence of demagnetizing field can be reduced. Moreover, a substantial increase in the thickness of the magnetic material layer is enabled, and hence a magnetic characteristic (magnetic permeability×a thickness) of the entire bulk can be enhanced.

In the first to fourth embodiments and examples to be described later, a material configuration and a diffraction pattern can be determined (analyzed) by means of SEM (Scanning Electron Microscopy), TEM (Transmission Electron Microscopy), or XRD (X-ray Diffraction). A trace amount of element can be determined by means of ICP (Inductively coupled Plasma) optical emission spectroscopy, fluorescent X-ray analysis, EPMA (Electron Probe Micro-Analysis), EDX (Energy Dispersive X-ray Spectrometer), or the like. A substituent group can be determined (analyzed) by means of IR (Infrared) absorption, or the like.

A filling factor of magnetic metal particles can be comprehensively determined by means of a mass saturation magnetization value determined by VSM (Vibrating Sample Magnetometer) or a quantitatively-analyzed value of XRD. In measuring a particle size of the magnetic metal particles, the longest diagonal line and the shortest diagonal line of each particle are averaged by means of TEM observation, and a result of averaging is taken as a particle size of that particle. An average of the particle sizes is determined, thereby determining the particle size of the magnetic metal particles.

EXAMPLES

Examples which are specific examples of the present invention and comparative examples will be described hereunder while being contrasted with each other.

Measurement of an average particle size of the magnetic metal particles deposited in Examples 1 to 6 provided below was performed by means of TEM observation. Specifically, the longest diagonal line and the shortest diagonal line of each particle indicated through observation (photographing) were averaged, and a result of averaging was taken as a particle size of the particle. An average particle size was determined by averaging the thus-determined particle sizes. Three or more unit areas, each of which measures 10 μm×10 μm, were photographed, whereby an average was determined. Further, by means of the mass saturation magnetization value determined through VSM and the quantitatively-analyzed value determined by XRD, the filling rate of magnetic metal particles was quantitatively evaluated as a filling rate of magnetic metal particles acquired at the time of elimination of voids.

Example 1

A hydroxide ($Co(OH)_2$) of Co (magnetic metal formation salt), a hydroxide ($Mg(OH)_2$) of Mg (oxide formation salt), and carbonate ($Li_2CO_3$) of Li (additive oxide formation salt) were mixed at a Co:Mg:Li mol ratio of 4:1:0.2. Subsequently, the mixture was pre-sintered for five hours at 110° C., to thus evaporate a hydrate. Thus, precursor particles were prepared.

The precursor particles were put into a hydrogen furnace and heated up to 600° C. while a hydrogen gas of 99.9% purity was flowed at a rate of 200 mL/min., and the precursor particles were maintained at that temperature for thirty minutes and then subjected to reduction.

Subsequently, the furnace was cooled, to thus manufacture a granular high-frequency magnetic material having a particle size of about 1 μm. The thus-acquired granular high-frequency magnetic material had a form in which Co particles having an average particle size of 52±12 nm were deposited in MgO at a volume filling rate of 50%.

Next, the thus-acquired plural granular high-frequency magnetic materials were mixed with 2 weight percent of epoxy resin and molded into a sheet having a width of about 4 mm, a length of about 5 mm, and a thickness of about 1 mm. The sheet was heated at 150° C. and provided as a sample for evaluation purpose.

Example 2

A hydroxide ($Co(OH)_2$) of Co (magnetic metal formation salt), a hydroxide ($Mg(OH)_2$) of Mg (oxide formation salt), and carbonate ($Na_2HCO_3$) of Na (additive oxide formation salt) were mixed at a Co:Mg:Na mol ratio of 4:1:0.2. Subsequently, the mixture was pre-sintered for five hours at 110° C., to thus evaporate a hydrate. Thus, precursor particles were prepared.

The precursor particles were put into the hydrogen furnace and heated up to 600° C. while a hydrogen gas of 99.9% purity was flowed at a rate of 200 mL/min., and the precursor particles were maintained at that temperature for thirty minutes and then subjected to reduction. Subsequently, the furnace was cooled, to thus manufacture a granular high-frequency magnetic material having a particle size of about 1 μm.

The thus-acquired granular high-frequency magnetic material had a form in which Co particles having an average particle size of 43±15 nm were deposited in MgO at a volume filling rate of 52%. Subsequently, a sheet-shaped sample for evaluation purpose was formed from the granular high-frequency magnetic material in the same manner as in Example 1.

Example 3

A hydroxide ($Co(OH)_2$) of Co (magnetic metal formation salt), a hydroxide ($Mg(OH)_2$) of Mg (oxide formation salt), and carbonate ($BaCO_3$) of Ba (additive oxide formation salt) were mixed at a Co:Mg:Ba mol ratio of 4:1:0.1. Subsequently, the mixture was pre-sintered for five hours at 110° C., to thus evaporate a hydrate. Thus, precursor particles were prepared.

The precursor particles were put into the hydrogen furnace and heated up to 600° C. while a hydrogen gas of 99.9% purity was flowed at a rate of 200 mL/min., and the precursor particles were maintained at that temperature for thirty minutes and then subjected to reduction. Subsequently, the furnace was cooled, to thus manufacture a granular high-frequency magnetic material having a particle size of about 1 μm. The thus-acquired granular high-frequency magnetic material had a form in which Co particles having an average particle size of 58±17 nm were deposited in MgO at a volume filling rate of 53%. Subsequently, a sheet-shaped sample for evaluation purpose was formed from the granular high-frequency magnetic material in the same manner as in Example 1.

Example 4

A hydroxide ($Co(OH)_2$) of Co (magnetic metal formation salt), a hydroxide ($Mg(OH)_2$) of Mg (oxide formation salt), and carbonate ($Li_2CO_3$) of Li (additive oxide formation salt) were mixed at a Co:Mg:Li mol ratio of 4:1:1. Subsequently, the mixture was pre-sintered for five hours at 110° C., to thus evaporate a hydrate. Thus, precursor particles were prepared.

Subsequently, the precursor particles were put into the hydrogen furnace and heated up to 600° C. while a hydrogen gas of 99.9% purity was flowed at a rate of 200 mL/min., and the precursor particles were maintained at that temperature for thirty minutes and then subjected to reduction. Subsequently, the furnace was cooled, to thus manufacture a granular high-frequency magnetic material having a particle size of about 1 μm.

The thus-acquired granular high-frequency magnetic material had a form in which Co particles having an average particle size of 60±20 nm were deposited in MgO at a volume filling rate of 50%. Subsequently, a sheet-shaped sample for evaluation purpose was formed from the granular high-frequency magnetic material in the same manner as in Example 1.

Example 5

A hydroxide ($Fe(OH)_2$) of Fe (magnetic metal formation salt), a hydroxide ($Mg(OH)_2$) of Mg (oxide formation salt), and carbonate ($Li_2CO_3$) of Li (additive oxide formation salt) were mixed at a Fe:Mg:Li mol ratio of 4:1:0.2. Subsequently, the mixture was pre-sintered for five hours at 110° C., to thus evaporate a hydrate. Thus, precursor particles were prepared.

The precursor particles were subsequently put into the hydrogen furnace and heated up to 600° C. while a hydrogen gas of 99.9% purity was flowed at a rate of 200 mL/min., and the precursor particles were maintained at that temperature for thirty minutes and then subjected to reduction. Subsequently, the furnace was cooled, to thus manufacture a granular high-frequency magnetic material having a particle size of about 1 μm. The thus-acquired granular high-frequency magnetic material had a form in which Fe particles having an average particle size of 51±10 nm were deposited in MgO at a volume filling rate of 53%. Subsequently, a sheet-shaped sample for evaluation purpose was formed from the granular high-frequency magnetic material in the same manner as in Example 1.

Example 6

A carbonate ($CoCO_3$) of Co (magnetic metal formation salt), a carbonate ($MgCO_3$) of Mg (oxide formation salt), and carbonate ($Li_2CO_3$) of Li (additive oxide formation salt) were mixed at a Co:Mg:Li mol ratio of 4:1:0.2. Subsequently, the mixture was pre-sintered for five hours at 110° C., to thus evaporate a hydrate. Thus, precursor particles were prepared.

The precursor particles were put into the hydrogen furnace and heated up to 600° C. while a hydrogen gas of 99.9% purity was flowed at a rate of 200 mL/min., and the precursor particles were maintained at that temperature for thirty minutes and then subjected to reduction. Subsequently, the furnace was cooled, to thus manufacture a granular high-frequency magnetic material having a particle size of about 1 µm. The thus-acquired granular high-frequency magnetic material had a form in which Co particles having an average particle size of 55±14 nm were deposited in MgO at a volume filling rate of 51%. A sheet-shaped sample for evaluation purpose was formed from the granular high-frequency magnetic material in the same manner as in Example 1.

In each of Examples 1 to 6, a difference between the deposited magnetic metal particles and the oxide in terms of standard generation Gibbs energy was 100 kJ/mol.

Comparative Example 1

FeAlSi particles were mixed with 2 weight percent of epoxy resin, and the mixture was molded into a sheet having a width of 4 mm, a length of 5 mm, and a thickness of 1 mm. The mold was heated at 150° C. and provided as a sample for evaluation purpose.

Comparative Example 2

Carbonyl iron particles were mixed with 2 weight percent of epoxy resin, and the mixture was molded into a sheet having a width of 4 mm, a length of 5 mm, and a thickness of 1 mm. The mold was heated at 150° C. and provided as a sample for evaluation purpose.

Comparative Example 3

A sheet measuring 4 mm wide, 5 mm long, and 1 mm thick was cut out of an NiZn ferrite sintered substance, and the sheet was provided as a sample for evaluation purpose.

Comparative Example 4

Fe powder having an average particle size of 1 µm and MgO powder having an average particle size of 1 µm were weighed so as to assume a mol ratio of 6:4. The two types of powder were mixed for one hour, to thus prepare mixed powder. The mixed powder was put into a container made of stainless steel as well as into a bowl made of stainless steel. The powder in the container was replaced with an argon gas and sealed. Subsequently, the sealed powder was subjected to mechanical alloying, wherein the powder was mixed for 100 hours at 300 rpm. Thus, Fe powder was pulverized to 100 nm.

After pulverization, in order to eliminate an oxide formed on the surface of the Fe powder, the mixed powder was introduced into a vacuum furnace and heated to 500° C. for one hour (heating rate was 500° C./hour). After the powder was subjected to reduction, a sheet-shaped sample for evaluation purpose was produced in the same manner as in Example 1.

Comparative Example 5

A hydroxide ($Co(OH)_2$) of Co (magnetic metal formation salt) and a hydroxide ($Mg(OH)_2$) of Mg (oxide formation salt) were mixed at a Co:Mg mol ratio of 4:1. Subsequently, the mixture was pre-sintered for five hours at 110° C., to thus evaporate a hydrate. Thus, precursor particles were prepared. The precursor particles were put into the hydrogen furnace and heated up to 600° C. while a hydrogen gas of 99.9% purity was flowed at a rate of 200 mL/min., and the precursor particles were maintained at that temperature for thirty minutes and then subjected to reduction. Subsequently, the furnace was cooled, to thus manufacture a granular high-frequency magnetic material having a particle size of about 1 µm.

The thus-acquired granular high-frequency magnetic material had a form in which Co particles having an average particle size of 56±48 nm were deposited in MgO at a volume filling rate of 52%. Subsequently, a sheet-shaped sample for evaluation purpose was formed from the granular high-frequency magnetic material in the same manner as in Example 1.

Comparative Example 6

CoO, MgO, $SiO_2$, $Li_2CO_3$ (which turns into $Li_2O$ when sintered) were mixed at a Co:Mg:Si:Li mol ratio of 4:1:0.1:0.1. Subsequently, the mixture was sintered for five hours at 1300° C. The sintered powder was subsequently put into the hydrogen furnace and heated up to 1000° C. while a hydrogen gas of 99.9% purity was flowed at a rate of 200 mL/min., and the powder was maintained at that temperature for thirty minutes and then subjected to reduction. Subsequently, the furnace was cooled, to thus manufacture a high-frequency magnetic material.

The thus-acquired granular high-frequency magnetic material had a form in which Co particles having an average particle size of 250±80 nm were deposited in MgO at a volume filling rate of 51%. Subsequently, a sheet-shaped sample for evaluation purpose was formed from the granular high-frequency magnetic material in the same manner as in Example 1.

Compositions of the precursor particles, and the like, employed in the thus-acquired Examples 1 to 6 and Comparative Examples 1 to 6 are shown in Table 1 provided below.

In relation to the samples for evaluation purpose of Examples 1 to 6 and Comparative Examples 1 to 6, a real part µ' of magnetic permeability, a change over time in a real part µ' of magnetic permeability achieved after elapse of 100 hours, and an electromagnetic wave absorption characteristic were studied. Results of the study are shown in Table 2 provided below. A method for measuring the characteristics is as follows.

(1) Method for Measuring a Real Part µ' of Magnetic Permeability

For each of the samples, a real part µ' of magnetic permeability was measured at 1 GHz.

(2) Method for Measuring a Change Over Time in the Real Part µ' Achieved after Elapse of 1000 Hours The sample for evaluation was left in a high-temperature humidistat at a temperature of 60° C. and a humidity of 90% for 1000 hours, and the real part µ' of magnetic permeability was measured again, to thus determine a change over time (ratio of the real part μ' of magnetic permeability achieved after the 1000 hours to that before the 1000 hours).

(3) Method for Measuring an Electromagnetic Wave Absorption Characteristic

A thin metallic plate having the same area as that of an electromagnetic exposure surface of the sample and a thickness of 1 mm was bonded to a surface of the sample opposite to its electromagnetic wave exposure surface. Measurement was performed by means of a reflection power method in a free space under an electromagnetic wave of 2 GHz in an $S_{11}$ mode of a sample network analyzer. The reflection power method is a process for measuring the amount of reduction (dB) in the reflection level from a sample by comparison with the reflection level from a thin metallic plate a perfect reflector not having the sample bonded. On the basis of a result of measurement, the amount of absorbed electromagnetic wave is defined as the amount of reflection attenuation. The amount of reflection attenuation was determined as a relative value when the amount of absorption determined in Comparative Example 1 was taken as one.

In general, a high-frequency magnetic material—which does not cause any substantial loss other than a ferromagnetic resonance loss and which exhibits high magnetic permeability even at high frequencies—as a high real part (μ') and a low imaginary part (μ") of magnetic permeability at frequency ranges which are lower than the ferromagnetic resonance frequency. The high-frequency magnetic material can be utilized as a high-permeability component, such as an inductor.

Moreover, the high-frequency magnetic material exhibits a low real part (μ') and a high imaginary part (μ") of magnetic permeability in the vicinity of the ferromagnetic resonance frequency, and hence the material can be utilized as electromagnetic wave absorber. In short, a single material can be used as both a high-permeability component and electromagnetic wave absorber by selection of a frequency range. For evaluation of a magnetic characteristic, the real part (μ') of magnetic permeability was evaluated at 1 GHz, thereby seeking the possibility as a high-permeability component. The amount of absorbed electromagnetic wave was measured at 2 GHz, to thus seek the possibility as electromagnetic wave absorber.

TABLE 1

| Example/Comparative Example | Composition of precursor | | | | Particle size of deposited magnetic metal particle and ±1 standard deviation (nm) | Volume ratio of magnetic metal particle (Vol. %) |
|---|---|---|---|---|---|---|
| | Magnetic metal formation salt | Oxide formation salt | Additive oxide formation salt | Composition | | |
| Example 1 | Co(OH)$_2$ | Mg(OH)$_2$ | Li$_2$CO$_3$ | Co:Mg:Li = 4:1:0.2 | 52 ± 12 | 50 |
| Example 2 | Co(OH)$_2$ | Mg(OH)$_2$ | NaHCO$_3$ | Co:Mg:Na = 4:1:0.2 | 43 ± 15 | 52 |
| Example 3 | Co(OH)$_2$ | Mg(OH)$_2$ | BaCO$_3$ | Co:Mg:Ba = 4:1:0.1 | 58 ± 17 | 53 |
| Example 4 | Co(OH)$_2$ | Mg(OH)$_2$ | Li$_2$CO$_3$ | Co:Mg:Li = 4:1:1 | 60 ± 20 | 50 |
| Example 5 | Fe(OH)$_2$ | Mg(OH)$_2$ | Li$_2$CO$_3$ | Fe:Mg:Li = 4:1:0.2 | 51 ± 10 | 53 |
| Example 6 | CoCO$_3$ | MgCO$_3$ | Li$_2$CO$_3$ | Co:Mg:Li = 4:1:0.2 | 55 ± 14 | 51 |
| Comparative Example 1 | — | — | | FeAlSi + Resin | — | — |
| Comparative Example 2 | — | — | | Carbonyl iron + Resin | — | — |
| Comparative Example 3 | — | — | | NiZn ferrite sintered substance | — | — |
| Comparative Example 4 | Fe | MgO | | Fe:Mg = 0.6:0.4 | 100 | — |
| Comparative Example 5 | Co(OH)$_2$ | Mg(OH)$_2$ | | Co:Mg = 4:1 | 56 ± 48 | 52 |
| Comparative Example 6 | CoO | MgO | Li$_2$CO$_3$ SiO$_2$ | Co:Mg:Si:Li = 4:1:0.1:0.1 | 250 ± 80 | 51 |

TABLE 2

| Example/Comparative Example | Characteristic of high-frequency magnetic material | | | |
|---|---|---|---|---|
| | Real part μ' of magnetic permeability (1 GHz) | Change over time in real part μ' of magnetic permeability after elapse of 1,000 hours (1 GHz) | Electromagnetic wave absorption characteristic (2 GHz) | Time required for manufacture (hour) |
| Example 1 | 110 | 0.98 | 1.7 | 12 |
| Example 2 | 98 | 0.97 | 1.74 | 12 |
| Example 3 | 97 | 0.98 | 1.72 | 12 |
| Example 4 | 107 | 0.98 | 1.80 | 12 |
| Example 5 | 115 | 0.96 | 1.7 | 12 |
| Example 6 | 109 | 0.97 | 1.75 | 12 |
| Comparative Example 1 | 10 | 0.8 | 1.0 | — |
| Comparative Example 2 | 2 | 0.76 | 0.4 | — |
| Comparative Example 3 | 5 | 0.96 | 0.65 | — |

TABLE 2-continued

Characteristic of high-frequency magnetic material

| Example/ Comparative Example | Real part μ' of magnetic permeability (1 GHz) | Change over time in real part μ' of magnetic permeability after elapse of 1,000 hours (1 GHz) | Electromagnetic wave absorption characteristic (2 GHz) | Time required for manufacture (hour) |
|---|---|---|---|---|
| Comparative Example 4 | 7 | 0.79 | 0.9 | 103 |
| Comparative Example 5 | 80 | 0.95 | 1.4 | 12 |
| Comparative Example 6 | 37 | 0.88 | 1.2 | 20 |

As is obvious from Table 1, for the high-frequency magnetic materials of the first through sixth examples, the uniform magnetic metal particles (having a small standard deviation) having an average particle size of 1 to 100 nm were distributed in an oxide at a filling factor of 50% or more. On the other hand, in the fifth comparative example in which an additive oxide phase was not mixed, it was seen that the average particle size of the magnetic metal particles is 56 nm; however, the particles had an extremely-large ±1 standard deviation value of 48, and the particles were not uniform. Further, as in the case of the sixth comparative example, in the case of the magnetic material which utilized a composite oxide of $Li_2O$—$SiO_2$ as an additive phase and which was synthesized from an oxide powder rather than salt, the deposited magnetic metal particles had a large particle size of 250 nm, and the standard deviation is extremely large.

As is evident from Table 2, the high-frequency magnetic materials of Examples 1 to 6 exhibited superior magnetic characteristics in comparison with the high-frequency magnetic materials of Comparative Examples 1 to 6. Although the real part (μ') of magnetic permeability is at 1 GHz, a flat frequency characteristic was exhibited, and an essentially-equal value is acquired even at 100 MHz.

In the high-frequency magnetic materials of Examples 1 to 6, changes over time in the real part of magnetic permeability achieved after elapse of 1,000 hours were small and exhibited extremely-high thermal stability.

In Examples 1 to 6, the real part (μ') of magnetic permeability achieved at 1 GHz is high, and superior thermal stability was attained. The materials exhibit the possibility as a high-permeability component at a 1-GHz range. Further, since the materials also exhibited superior electromagnetic wave absorption characteristics at 2 GHz, the materials exhibited the possibility as electromagnetic wave absorber at a 2-GHz range. Specifically, a single material can be used as a high-permeability component or electromagnetic wave absorber by changing an operation frequency band, and the substance is understood to exhibit wide general versatility. A time required by the manufacturing processes in the present embodiments is extremely shorter than the time required by mechanical alloying (the fourth comparative example); process cost can be curtailed significantly; and an attempt can be made to enhance production yield.

What is claimed is:

1. A high-frequency magnetic material comprising:
an oxide phase including:
a first oxide of a first element being at least one selected from the group consisting of Mg, Al, Si, Ca, Zr, Ti, Hf, Zn, Mn, a rare-earth element, Ba, and Sr, and
a second oxide of a second element being at least one selected from the group consisting of Li, Na, K, Rb, Cs, Be, Mg, Ca, Sr, Ba, and Zn, the second element being different from the first element,
the first oxide and at least a part of the second oxide being formed into a solid solution; and
magnetic metal particles including at least one of Fe and Co and having a particle size of 1 to 100 nm, the magnetic metal particles being deposited on a surface and inside of the oxide phase,
the magnetic metal particles occupying 50% or more of a volume of the high-frequency magnetic material exclusive of a void.

2. The high-frequency magnetic material according to claim 1, wherein the oxide phase includes a plurality of particles of the solid solution, and a part of the second oxide is present in a grain boundary of the particles of the solid solution.

3. The high-frequency magnetic material according to claim 2, wherein the particles of the oxide phase have an average particle size of 10 nm to 1 μm.

4. The high-frequency magnetic material according to claim 1, wherein the solid solution includes the second oxide in an amount of 0.1 to 50 mol % with respect to the first oxide.

5. The high-frequency magnetic material according to claim 1, wherein the high-frequency magnetic material is produced by reducing a precursor, the precursor comprising:
a first salt of a magnetic metal element, the first salt being at least one selected from the group consisting of an alkoxide, a hydroxide salt, a sulfate, a nitrate, a carbonate, and a carboxylate;
a second salt of at least one first element selected from the group consisting of Mg, Al, Si, Ca, Zr, Ti, Ht Zn, Mn, a rare-earth element, Ba, and Sr, the second salt being at least one selected from the group consisting of an alkoxide, a hydroxide salt, a sulfate, a nitrate, a carbonate, and a carboxylate; and
a third salt of at least one second element selected from the group consisting of Li, Na, K, Rb, Cs, Be, Mg, Ca, Sr, Ba, and Zn, the second element being different from the first element.

6. The high-frequency magnetic material according to claim 1, comprising: a magnetic layer including the magnetic metal particles; and a non-magnetic layer.

7. The high-frequency magnetic material according to claim 1, wherein the first element in the first oxide is bivalent and the second element in the second oxide is monovalent.

8. The high-frequency magnetic material according to claim 1, wherein the first element is Mg and the second element is Li.

9. The high-frequency magnetic material according to claim 1, wherein the second element is at least one selected from the group consisting of Li, Na, K, Rb, Cs, Be and Zn.

10. A high-frequency magnetic material comprising:
an oxide phase including:
   a first oxide of a first element being at least one selected from the group consisting of Mg, Al, Si, Ca, Zr, Ti, Hf, Zn, Mn, a rare-earth element, Ba, and Sr, and
   a second oxide of a second element selected from the group consisting of Li, Na, K, Rb, and Cs,
   the first oxide and at least a part of the second oxide being formed into a solid Solution; and
magnetic metal particles including at least one of Fe and Co and having a particle size of 1 to 100 nm, the magnetic metal particles being deposited on a surface and inside of the oxide phase,
the magnetic metal particles occupying 50% or more of a volume of the high-frequency magnetic material exclusive of a void.

11. The high-frequency magnetic material according to claim 1, wherein the oxide phase and the magnetic metal particles are aligned in at least two axes or more of respective crystal orientations.

12. A high-frequency magnetic material comprising:
an oxide phase including:
   a first oxide of a first element selected from the group consisting of Mg, Zn, Ca, and Mn, and
   a second oxide of a second element being at least one selected from the group consisting of Li, Na, K, Rb, and Cs,
   the first oxide and the second oxide being formed into a solid solution in an amount of the second oxide of 0.1 to 10 mol % with respect to the first oxide; and
magnetic metal particles including at least one of Fe and Co and having a particle size of 1 to 100 nm, the magnetic metal particles being deposited on a surface and inside of the oxide phase.

13. The high-frequency magnetic material according to claim 7, wherein the first element in the first oxide is bivalent and the second element in the second oxide is monovalent.

14. The high-frequency magnetic material according to claim 12, wherein the first element is Mg and the second element is Li.

* * * * *